US008243298B2

(12) United States Patent
Bongrazio et al.

(10) Patent No.: US 8,243,298 B2
(45) Date of Patent: Aug. 14, 2012

(54) LOW-PAPER SENSOR USING ROLLERS

(75) Inventors: Stacy Leigh Bongrazio, Raleigh, NC (US); Richard Hunter Harris, Raleigh, NC (US); Robert Dean Yoder, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 1255 days.

(21) Appl. No.: 11/619,296

(22) Filed: Jan. 3, 2007

(65) Prior Publication Data

US 2008/0162057 A1 Jul. 3, 2008

(51) Int. Cl.
*G06K 15/00* (2006.01)
*G06F 3/12* (2006.01)
*B41J 11/50* (2006.01)
*B41J 11/48* (2006.01)

(52) U.S. Cl. ....... 358/1.14; 358/1.15; 400/582; 400/603

(58) Field of Classification Search ........................ None
See application file for complete search history.

(56) References Cited

U.S. PATENT DOCUMENTS 2,581,711 A * 1/1952 Roselius .................... 242/563.2
6,367,992 B1 * 4/2002 Aruga et al. .................... 400/76
2002/0197091 A1 * 12/2002 Otsuki .......................... 400/582
2004/0056086 A1 * 3/2004 Mason et al. ................. 235/379
2004/0252329 A1 * 12/2004 Sorenson ...................... 358/1.15
2005/0162497 A1 * 7/2005 Matsui et al. ................. 347/109
2005/0241501 A1 * 11/2005 Zuber et al. ................... 101/148
2007/0269246 A1 * 11/2007 Tomatsu et al. ............... 399/401

FOREIGN PATENT DOCUMENTS

JP 10167538 * 6/1998

OTHER PUBLICATIONS

U.S. Appl. No. 11/611,253, filed Dec. 15, 2006, Vorhees et al.
U.S. Appl. No. 11/534,056, filed Sep. 21, 2006, Cato et al.

* cited by examiner

*Primary Examiner* — King Poon
*Assistant Examiner* — Ming Hon
(74) *Attorney, Agent, or Firm* — Yee & Associates, P.C.; Tom Tyson

(57) ABSTRACT

A computer implemented method, data processing system, and computer usable program code are provided for detecting a printer condition. A set of signals is received from a sensor in a printer. A current state of a paper roll within the printer is detected within the set of signals. Responsive to the current state indicating that the paper roll moved from a desired position between a set of devices, a response signal is sent to the user of the printer. Alternatively, in response to the current state indicating that the paper roll moved from the desired position, a number of paper line feed commands that are issued are counted. A determination is made as to whether the number of paper line feed commands that are issued exceeds a predetermined value. Responsive to the number of paper line feed commands exceeding the predetermined value, the response signal is sent.

12 Claims, 4 Drawing Sheets

LOW-PAPER SENSOR USING ROLLERS

BACKGROUND OF THE INVENTION

1. Field of the Invention

The present invention relates to an improved data processing system and more particularly to sensing low-paper conditions in a printer. Still more specifically, the present invention relates generally to a computer implemented method, data processing system, and computer usable program code for sensing low-paper conditions using rollers in a printer.

2. Description of the Related Art

Printers are currently found in many forms; however, all printers share common characteristics, such as a print head, a platen, and a control mechanism. The control mechanism controls the motion of the print head relative to the paper, selects a character to be printed, and advances and retracts the paper as necessary.

It is undesirable for a printer to operate without paper. Ink-based printers that are operated without paper will transfer the ink into the platen which may in turn stain the back sides of subsequent sheets of paper and possibly damage print writes in the print head. Thermal printers operated without paper may overheat because paper is used to absorb the heat generated by the print head during printing operations or cause excessive wear to the print head because it is running on the platen rather than the paper. Also, any printer that operates without paper will cause frustration when documents must be reprinted.

In order to avoid a printer operating without paper, printers often provide low-paper warnings. Low-paper sensing has become an important requirement as retailers move towards system management and require system notification that a printer is about to run out of paper. Current printer systems offer low-paper sensors that have poor accuracy. The low-paper sensors consist of a lever that rubs on one side edge of the paper roll. As the diameter of the roll decreases to a smaller diameter, the lever either drops over the top of the roll or into the core of the roll. This action trips a switch which signals that paper is low. The accuracy of these systems is poor because the paper roll jumps around as paper is fed. Also, the lever protrudes into the paper bucket cavity which can complicate loading paper and removing the nearly empty or empty core. Additionally, the lever can interfere with the paper as it is fed after the low-paper signal, which may cause paper jams.

BRIEF SUMMARY OF THE INVENTION

The different illustrative embodiments provide a computer implemented method, data processing system, and computer usable program code for detecting a printer condition. The illustrative embodiments receive a set of signals from a sensor in a printer. The illustrative embodiments detect within the set of signals a current state of a paper roll containing paper within the printer. The illustrative embodiments send a response signal to the user of the printer in response to the current state indicating that the paper roll moved from a desired position between a set of devices.

Alternatively, the illustrative embodiments count a number of paper line feed commands that are issued in response to the current state indicating that the paper roll moved from the desired position between the set of devices. The illustrative embodiments determine if the number of paper line feed commands that are issued exceeds a predetermined value. The illustrative embodiments send the response signal to the user of the printer in response to the number of paper line feed commands exceeding the predetermined value.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
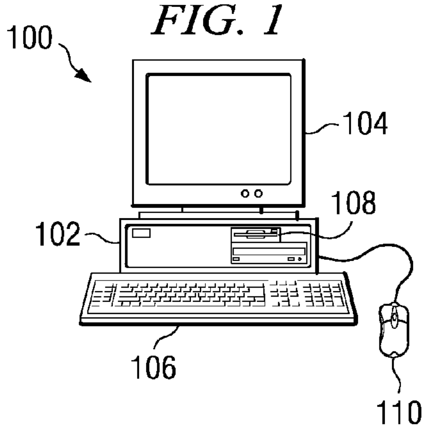
FIG. 1 shows a pictorial representation of a data processing system in which the illustrative embodiments may be implemented.

The illustrative embodiments provide sensing a low-paper condition using rollers. With reference now to the figures and in particular with reference to FIG. 1, a pictorial representation of a data processing system is shown in which the illustrative embodiments may be implemented. Computer 100 includes system unit 102, video display terminal 104, keyboard 106, storage devices 108, which may include floppy drives and other types of permanent and removable storage media, and mouse 110. Additional input devices may be included with personal computer 100. Examples of additional input devices include a joystick, touchpad, touch screen, trackball, microphone, and the like.

Computer 100 may be any suitable computer, such as an IBM® eServer™ computer or IntelliStation® computer, which are products of International Business Machines Corporation, located in Armonk, N.Y. Computer 100 may also be a Point of Sale system with additional input devices such as optical scanner, magnetic card reader, special terminals, and printers. Although the depicted representation shows a personal computer, other embodiments may be implemented in other types of data processing systems. For example, other embodiments may be implemented in a network computer. Computer 100 also preferably includes a graphical user interface (GUI) that may be implemented by means of systems software residing in computer readable media in operation within computer 100.

Figure 2:
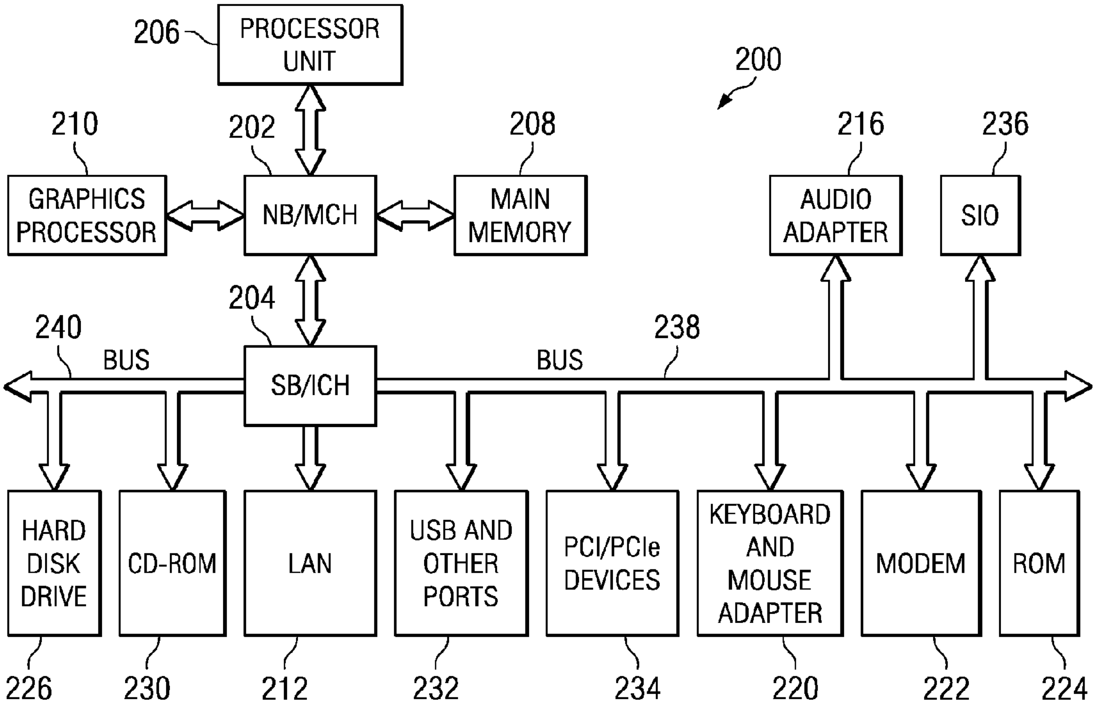
FIG. 2 depicts a block diagram of a data processing system in which the illustrative embodiments may be implemented.

Next, FIG. 2 depicts a block diagram of a data processing system in which the illustrative embodiments may be implemented. Data processing system 200 is an example of a computer, such as computer 100 in FIG. 1, in which code or instructions implementing the processes of the illustrative embodiments may be located.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204, audio adapter 216, keyboard and mouse adapter 220, modem 222, read only memory (ROM) 224, universal serial bus (USB) ports, and other communications ports 232. PCI/PCIe devices 234 are coupled to south bridge and I/O controller hub 204 through bus 238. Hard disk drive (HDD) 226 and CD-ROM drive 230 are coupled to south bridge and I/O controller hub 204 through bus 240.

PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206. This operating system coordinates and controls various components within data processing system 200 in FIG. 2. The operating system may be a commercially available operating system, such as Microsoft® Windows XP®. (Microsoft® and Windows XP® are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java-based trademarks are trademarks of Sun Microsystems, Inc. in the United States, other countries, or both.

Instructions for the operating system, the object-oriented programming system, and applications or programs are located on storage devices, such as hard disk drive 226. These instructions and may be loaded into main memory 208 for execution by processing unit 206. The processes of the illustrative embodiments may be performed by processing unit 206 using computer implemented instructions, which may be located in a memory. An example of a memory is main memory 208, read only memory 224, or in one or more peripheral devices.

The hardware shown in FIG. 1 and FIG. 2 may vary depending on the implementation of the illustrated embodiments. Other internal hardware or peripheral devices, such as flash memory, equivalent non-volatile memory, or optical disk drives and the like, may be used in addition to or in place of the hardware depicted in FIG. 1 and FIG. 2. Additionally, the processes of the illustrative embodiments may be applied to a multiprocessor data processing system.

The systems and components shown in FIG. 2 can be varied from the illustrative examples shown. In some illustrative examples, data processing system 200 may be a personal digital assistant (PDA). A personal digital assistant generally is configured with flash memory to provide a non-volatile memory for storing operating system files and/or user-generated data. Additionally, data processing system 200 can be a tablet computer, laptop computer, Point of Sale device, or telephone device. Point of Sale devices may be devices, such as cash registers, optical scanner, magnetic card reader, special terminals, and printers.

Other components shown in FIG. 2 can be varied from the illustrative examples shown. For example, a bus system may be comprised of one or more buses, such as a system bus, an I/O bus, and a PCI bus. Of course the bus system may be implemented using any suitable type of communications fabric or architecture that provides for a transfer of data between different components or devices attached to the fabric or architecture. Additionally, a communications unit may include one or more devices used to transmit and receive data, such as a modem or a network adapter. Further, a memory may be, for example, main memory 208 or a cache such as found in north bridge and memory controller hub 202. Also, a processing unit may include one or more processors or CPUs.

The depicted examples in FIG. 1 and FIG. 2 are not meant to imply architectural limitations. In addition, the illustrative embodiments provide for a computer implemented method, apparatus, and computer usable program code for compiling source code and for executing code. The methods described with respect to the depicted embodiments may be performed in a data processing system, such as data processing system 100 shown in FIG. 1 or data processing system 200 shown in FIG. 2.

The illustrative embodiments provide for detecting states in a printer, such as, for example, cover open, paper out, and paper jam conditions using a single optical sensor in a printer. Using the optical sensor to perform detection of different states, provides improved reliability over existing single function sensors in which a separate sensor is used to detect a different state in the printer. In the illustrative embodiments, an optical sensor provides a single interface that allows firmware to distinguish between cover open, paper out, and paper jam conditions. Additionally, a single optical sensor may cost much less than using numerous switches to perform detection of states, such as cover open, paper out, and paper jam detection. Therefore, implementing a common optical sensor provides considerable printer product cost reduction.

Figure 3:
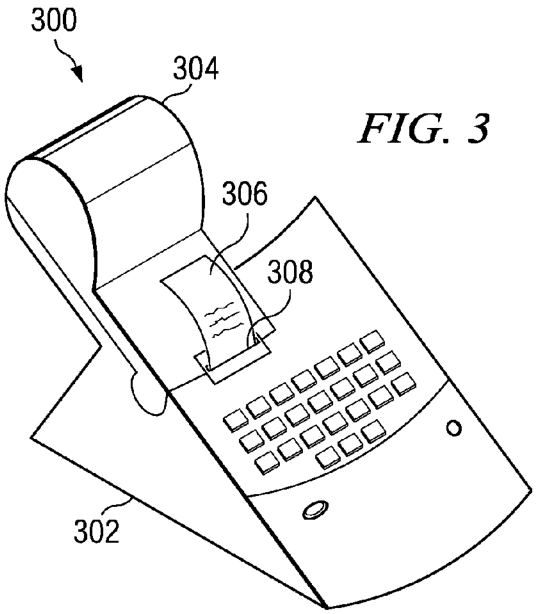
FIG. 3 depicts an exemplary printer in which the optical sensor may be implemented in accordance with an illustrative embodiment.

FIG. 3 depicts an exemplary printer in which the optical sensor may be implemented in accordance with an illustrative embodiment. Printer 300 includes base unit 302, cover 304, and paper 306. Paper 306 is within base unit 302 and covered with cover 304. Paper 306 is printed within base unit 302 and exits printer 300 through slot 308 in cover 304. Printer 300 is an exemplary printer which is shown to be a stand-alone printer; however, printer 300 may also be part of a cash register, optical scanner, magnetic card reader, special terminal, or other Point-of-Sale devices.

Figure 4:
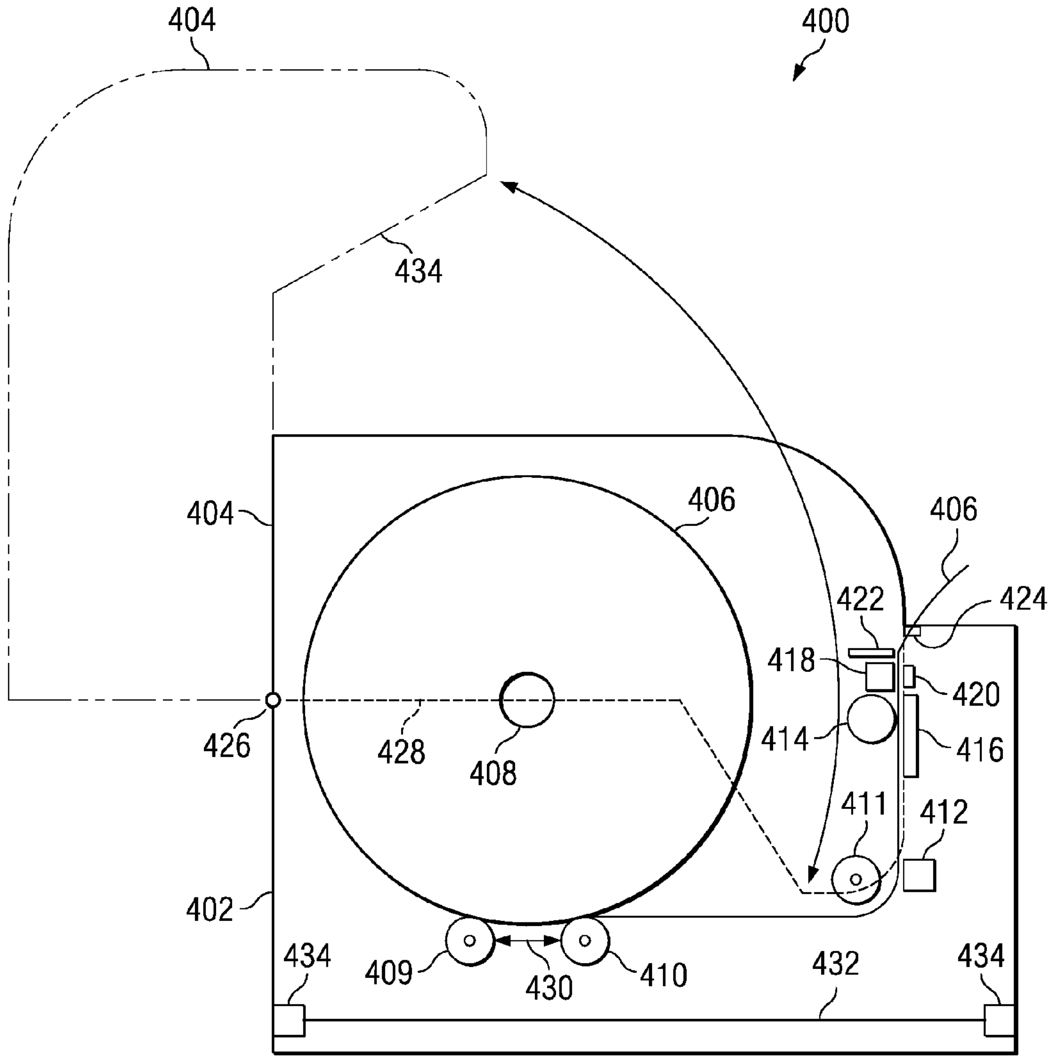
FIG. 4 illustrates one implementation of sensing low paper in a printer in accordance with an illustrative embodiment.

FIG. 4 illustrates one implementation of sensing low paper in a printer in accordance with an illustrative embodiment. Printer 400 includes base unit 402, cover 404, and paper 406. Paper 406 in this example is rolled up on paper roll 408 and paper 406 is a type of paper that is commonly used in Point of Sale devices. Paper 406 feeds through a path in printer 400 while resting on rollers 409 and 410, and passes around roller 411, past black mark sensor 412, around roller 414, by thermal print head 416, between cutter 418 and cutter base 420, by cutter sensor 422 and through slot 424 where paper 406 exits printer 400. Black mark sensor 412 senses preprinted targets on paper 406 so that the print may align with preprinted form. Roller 414 allows paper to pass between roller 414 and thermal print head 416 so that paper 406 may be printed with information. Cutter 418 cuts paper 406 when appropriate by pressing a blade or other sharp implement within cutter 418 against cutter base 420. Cutter sensor 422 detects that cutter 418 and cutter base 420 have separated and that the paper path is open to allow paper 406 to be fed. Cover 404 pivots around pivot point 426 on the end of cover parting line 428.

Rollers 409 and 410 are set at a predetermined distance apart, which may be referred to as roller gap 430, such that paper 406 and paper roll 408 will move from a desired position or drop between rollers 409 and 410 when the diameter of paper roll 408 and paper 406 becomes less than the predetermined value determined by roller gap 430. While the illustrative embodiments depict rollers 409 and 410 set at a predetermined distance apart to provide roller gap 430, one of ordinary skill in the art would realize that any set of devices may be used to provide roller gap 430, such as a set of rectangular or squarely shaped gliding devices, as set of non-rolling cylindrical shaped surfaces, or even a set of ball-bearing raceways. Optical beam 432 is positioned below roller gap 430, a distance of at least half of roller gap 430 to ensure that the beam is not broken before paper roll 408 and paper 406 move from the desired position or drop. Once paper roll 408 and paper 406 drop between rollers 409 and 410, optical beam 432 between optical sensors 434 is broken and printer's 400 processing unit, such as processing unit 206 of FIG. 2, starts counting print line feeds that are issued by the processing unit. The processing unit counts the print line feeds until the number of print line feeds exceeds a predetermined number of print line feeds, at which time, the processing unit issues a low-paper signal. The predetermined number of print line feeds may be set by the retailer depending on the diameter of paper roll 408, sensitivity to running out of paper, and/or the thickness of paper 406.

When the parameters of paper roll 408 and paper 406 changes, or the retailer's low-paper rules change, the predetermined number of line feeds could be reconfigured by downloading new parameters. If printer 400 is shut down or cover 404 is opened and the diameter of paper roll 408 and paper 406 is larger than roller gap 430, printer 400 operates normally when printer 400 resets. If printer 400 is shut down or cover 404 is opened and the diameter of paper roll 408 and paper 406 is smaller than the predetermined distance apart, non-volatile memory, such as main memory 208 of FIG. 2, may store the number of print line feeds that were issued after the processing unit started counting print line feeds issued by the processing unit. Then, when printer 400 is reset, the processing unit uses the stored number of print line feeds as a starting point to continue counting the number of print line feeds.

Figure 5:
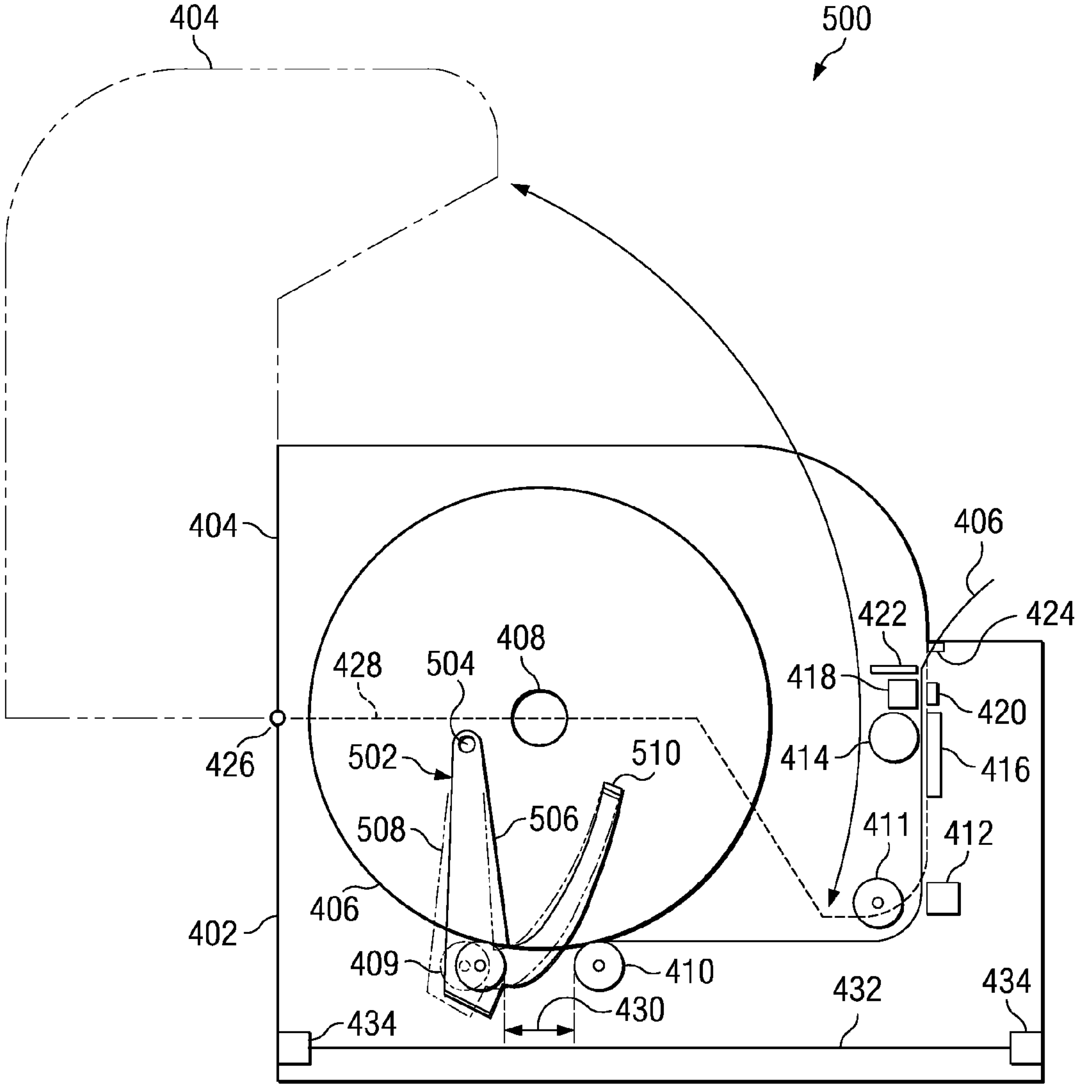
FIG. 5 illustrates an alternative implementation of sensing low paper in a printer in accordance with an illustrative embodiment.

FIG. 5 illustrates an alternative implementation of sensing low paper in a printer in accordance with an illustrative embodiment. Printer 500 is the same printer as printer 400 of FIG. 4 except that roller 409 is mounted on adjustable frame 502. Adjustable frame 502 may be rotated about pivot point 504, as shown from positions 506 and 508. Adjustable frame 502 is secured to base unit 402 and is adjusted by using handle 510 to set the desired roller gap 430 between rollers 409 and 410. Paper 406 rests between rollers 409 and 410. In this illustrative embodiment, the retailer sets roller 409 a distance apart from roller 410 using adjustable frame 502, such that printer's 500 processing unit, such as processing unit 206 of FIG. 2, indicates a low-paper signal when paper roll 408 and paper 406 fall between rollers 409 and 410 and optical beam 432 between optical sensors 434 is broken.

Figure 6:
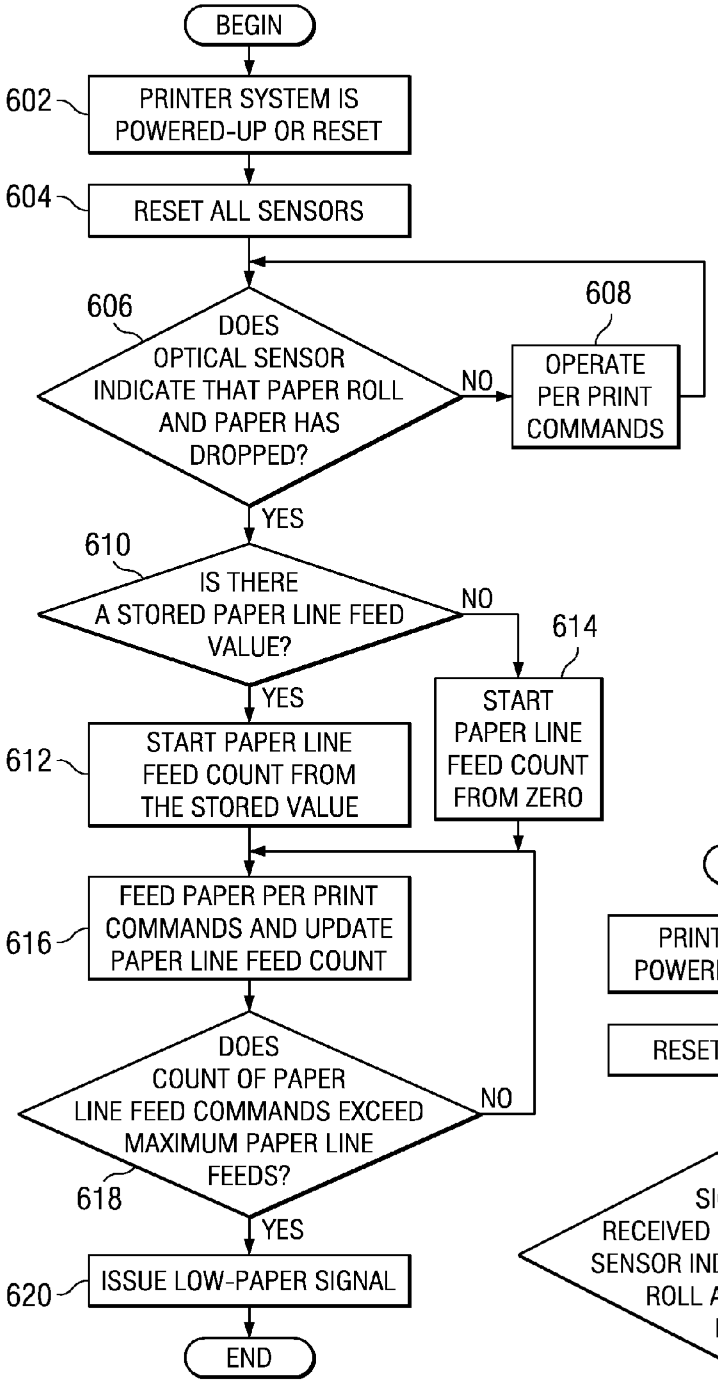
FIG. 6 depicts a flowchart of one operation for determining a low-paper condition in a printer in accordance with an illustrative embodiment.

FIG. 6 depicts a flowchart of one operation for determining a low-paper condition in a printer in accordance with an illustrative embodiment. A processing unit, such as processing unit 206 of FIG. 2, executing instructions, detects the states using the optical sensor, such as optical sensor 434 in FIG. 4. As the operation begins, a printer system is powered-up or reset (step 602). Resetting of the printer may result from a previous low-paper condition being addressed, such as changing the paper roll. An initial state of the printer is determined starting with the processing unit resetting all of the sensors in the printer (step 604). Then, the processing unit determines whether the optical sensor indicates that the paper has moved from a desired position or dropped through the rollers (step 606). If at step 606 the paper has not dropped through the rollers, the printer continues to operate per the print commands (step 608), with the operation returning to step 606. If the paper has dropped through the rollers, the processing unit determines if there is a stored paper line feed value (step 610).

If at step 610 there is a stored paper line feed value, then the paper line feed count starts from the stored value (step 612). If at step 610 there is no stored paper line feed value, then the paper line feed count starts from zero (step 614). From steps 612 or 614, paper is fed, and the paper line feed count is updated as the printer responds to print commands (step 616). Next, a determination is made as to whether the paper line feed count exceeds a predetermined maximum paper line feed value (step 618) and, if the paper feed count exceeds the maximum paper line feed value, a low-paper signal in issued (step 620), with the operation terminating thereafter. If the paper feed count does not exceed the maximum paper line feed count, the process returns to step 616.

Figure 7:
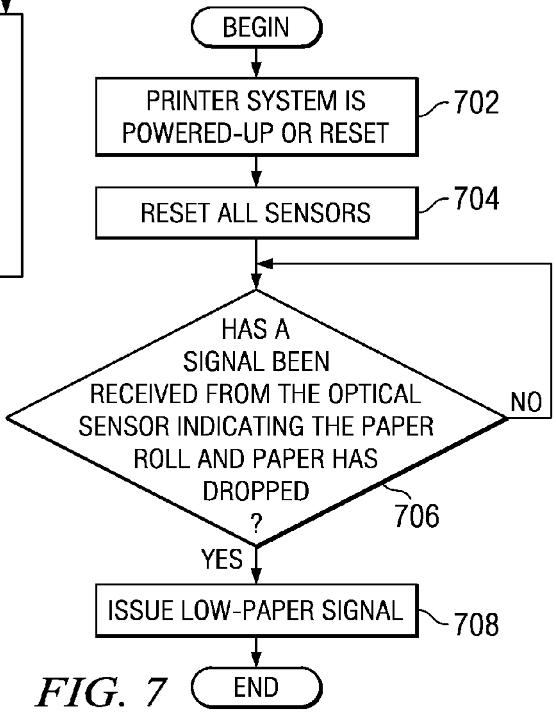
FIG. 7 depicts a flowchart of an alternative operation for determining a low-paper condition in a printer in accordance with an illustrative embodiment.

FIG. 7 depicts a flowchart of an alternative operation for determining a low-paper condition in a printer in accordance with an illustrative embodiment. A processing unit, such as processing unit 206 of FIG. 2, executing instructions, detects the states using the optical sensor, such as optical sensor 434 in FIG. 5. As the operation begins, a printer system is powered-up or reset (step 702). Resetting of the printer may result from a previous low-paper condition being addressed, such as changing the paper roll. An initial state of the printer is determined starting with the processing unit resetting all of the sensors in the printer (step 704). Then, the processing unit determines if a signal has been received from the optical sensor indicating that the paper roll and paper have moved from a desired position or dropped (step 706).

If at step 706, the optical sensor does not indicate the paper roll and paper have dropped, then the operation returns to step 706 to wait until the optical sensor detects that the paper roll and paper have dropped. If at step 706, the optical sensor indicates that the paper roll and paper has dropped, then the processing unit issues a response signal, such as a low-paper signal (step 708), with the operation termination thereafter.

Thus, the illustrative embodiments provide for detecting a printer condition. A set of signals is received from a sensor in a printer. A current state of a paper roll containing paper within the printer is detected within the set of signals. Responsive to the current state indicating that the paper roll moved from a desired position between a set of devices, a response signal is sent to the user of the printer.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for detecting a printer condition, the computer implemented method comprising:

receiving a set of signals from an optical sensor detecting an optical beam in a printer;

detecting within the set of signals a current state of a paper roll containing paper within the printer, wherein a falling paper roll breaks the optical beam;

responsive to the current state indicating that the paper roll moved from a desired position between a set of devices, sending a response signal;

responsive to the current state indicating that the paper roll moved from the desired position between the set of devices, counting a number of paper line feed commands that are issued;

determining if the number of the paper line feed commands that are issued exceeds a predetermined value; and responsive to the number of the paper line feed commands exceeding the predetermined value, sending the response signal, wherein the set of devices comprise a fixed roller and an adjustable roller defining a roller gap, the adjustable roller mounted on a frame, the frame rotatable about a pivot point, the optical sensor and optical beam positioned below the roller gap a distance of at least one half the roller gap; and an adjusting handle affixed to the frame for adjusting the adjustable roller.

2. The computer implemented method of claim 1, wherein the predetermined value is based on at least one of a diameter of the paper roll, sensitivity to running out of the paper, or a thickness of the paper.

3. The computer implemented method of claim 1, further comprising:

responsive to the current state indicating that the paper roll moved from the desired position between the set of devices, determining if a stored paper line feed value exists;

responsive to an existence of the stored paper line feed value, counting a number of paper line feed commands that are issued starting at the stored paper line feed value;

determining if the number of the paper line feed commands that are issued exceeds a predetermined value; and responsive to the number of the paper line feed commands exceeding the predetermined value, sending the response signal.

4. The computer implemented method of claim 1, wherein the response signal is a low-paper printer condition.

5. A data processing system comprising:

a bus system;

a communications system connected to the bus system;

a memory connected to the bus system, wherein the memory includes a set of instructions; and a processing unit connected to the bus system, wherein the processing unit executes the set of instructions to receive a set of signals from an optical sensor detecting an optical beam in a printer; detect within the set of signals a current state of a paper roll containing paper within the printer, wherein a falling paper roll breaks the optical beam; send a response signal in response to the current state indicating that the paper roll moved from a desired position between a set of devices; count a number of paper line feed commands that are issued in response to the current state indicating that the paper roll moved from the desired position between the set of devices; determine if the number of the paper line feed commands that are issued exceeds a predetermined value; and send the response signal in response to the number of the paper line feed commands exceeding the predetermined value, wherein the set of devices comprise a fixed roller and an adjustable roller defining a roller gap, the adjustable roller mounted on a frame, the frame rotatable about a pivot point, the optical sensor and optical beam positioned below the roller gap a distance of at least one half the roller gap, and a handle affixed to the frame for adjusting the adjustable roller.

6. The data processing system of claim 5, wherein the predetermined value is based on at least one of a diameter of the paper roll, sensitivity to running out of the paper, or a thickness of the paper.

7. The data processing system of claim 5, wherein the processing unit executes the set of instructions to determine if a stored paper line feed value exists in response to the current state indicating that the paper roll moved from the desired position between the set of devices; counting a number of paper line feed commands that are issued starting at the stored paper line feed value in response to an existence of the stored paper line feed value; determine if the number of the paper line feed commands that are issued exceeds a predetermined value; and sending the response signal in response to the number of the paper line feed commands exceeding the predetermined value.

8. The data processing system of claim 5, wherein the response signal is a low-paper printer condition and wherein the sensor is an optical sensor in the printer.

9. A computer program product comprising:

a non-transitory computer usable medium including computer usable program code for detecting a printer condition, the computer program product including:

computer usable program code for receiving a set of signals from an optical sensor detecting an optical beam in a printer;

computer usable program code for detecting within the set of signals a current state of a paper roll containing paper within the printer, wherein a falling paper roll breaks the optical beam;

computer usable program code for sending a response signal in response to the current state indicating that the paper roll moved from a desired position between a set of devices;

computer usable program code for counting a number of paper line feed commands that are issued in response to the current state indicating that the paper roll moved from the desired position between the set of devices;

computer usable program code for determining if the number of the paper line feed commands that are issued exceeds a predetermined value; and computer usable program code for send the response signal in response to the number of the paper line feed commands exceeding the predetermined value, wherein the set of devices comprise a fixed roller and an adjustable roller defining a roller gap, the adjustable roller mounted on a frame, the frame rotatable about a pivot point, the optical sensor and optical beam positioned below the roller gap a distance of at least one half the roller gap; and a handle affixed to the frame for adjusting the adjustable roller.

10. The computer program product of claim 9, wherein the predetermined value is based on at least one of a diameter of the paper roll, sensitivity to running out of the paper, or a thickness of the paper.

11. The computer program product of claim 9, further including:

computer usable program code for determining if a stored paper line feed value exists in response to the current state indicating that the paper roll moved from the desired position between the set of devices;

computer usable program code for counting a number of paper line feed commands that are issued starting at the stored paper line feed value in response to an existence of the stored paper line feed value;

computer usable program code for determining if the number of the paper line feed commands that are issued exceeds a predetermined value; and computer usable program code for sending the response signal in response to the number of the paper line feed commands exceeding the predetermined value.

12. The computer program product of claim 9, wherein the response signal is a low-paper printer condition and wherein the sensor is an optical sensor in the printer.

* * * * *